(12) United States Patent
Itoh

(10) Patent No.: US 8,567,956 B2
(45) Date of Patent: Oct. 29, 2013

(54) PROJECTOR

(75) Inventor: Yoshitaka Itoh, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 273 days.

(21) Appl. No.: 13/158,739

(22) Filed: Jun. 13, 2011

(65) Prior Publication Data

US 2011/0304827 A1 Dec. 15, 2011

(30) Foreign Application Priority Data

Jun. 15, 2010 (JP) ................................. 2010-136218

(51) Int. Cl.
  *G03B 21/14* (2006.01)
  *G03B 21/26* (2006.01)
  *G02F 1/1335* (2006.01)
  *H04N 5/74* (2006.01)
  *G02F 1/00* (2006.01)

(52) U.S. Cl.
  USPC .................... 353/20; 353/30; 349/5; 348/758

(58) Field of Classification Search
  None
  See application file for complete search history.

(56) References Cited

U.S. PATENT DOCUMENTS

| 5,897,191 | A | * | 4/1999 | Clarke | 353/31 |
| 5,982,538 | A | * | 11/1999 | Shikama et al. | 359/465 |
| 7,021,766 | B2 | * | 4/2006 | Uehara | 353/20 |
| 7,641,346 | B2 | * | 1/2010 | Berman | 353/81 |
| 2005/0078278 | A1 | * | 4/2005 | Uehara et al. | 353/20 |
| 2005/0248733 | A1 | * | 11/2005 | Sakata et al. | 353/94 |
| 2008/0192155 | A1 | * | 8/2008 | Uchiyama | 349/8 |
| 2010/0253920 | A1 | * | 10/2010 | Miyazawa | 353/20 |

FOREIGN PATENT DOCUMENTS

JP     08-029779     2/1996

* cited by examiner

*Primary Examiner* — William C Dowling
*Assistant Examiner* — Ryan Howard
(74) *Attorney, Agent, or Firm* — Workman Nydegger

(57) ABSTRACT

A projector includes a liquid crystal light valve to which the image data is written in a line sequential manner, a polarization switching element for switching between the first and second polarization states throughout the switching areas in a line sequential manner, and a birefringent optical element for changing the light path of the incident light in accordance with the polarization state thereof. The boundary position between the switching areas of the first and second polarization states moves in sync with the boundary position between the first and second image data writing areas corresponding to the first and second sub-frame.

17 Claims, 9 Drawing Sheets

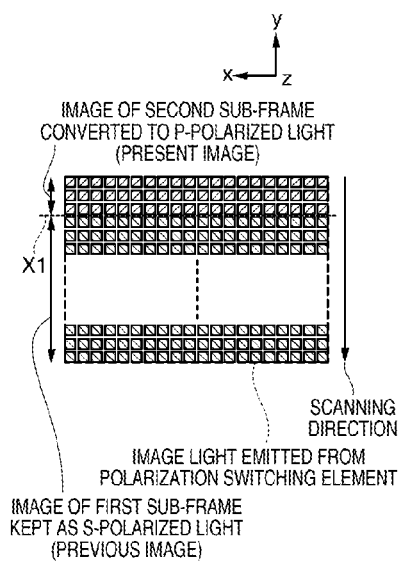 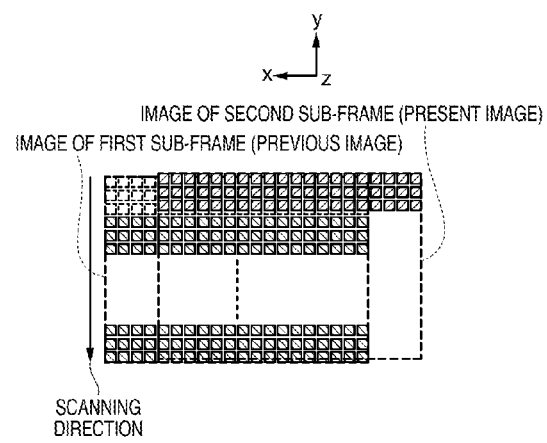
FIG. 4A
FIG. 4B

PROJECTOR

BACKGROUND

1. Technical Field

The present invention relates to a projector, and in particular to a projector increasing the number of pixels using an optical method to thereby make it possible to display a high resolution projection image.

2. Related Art

In conjunction with the spread of high-resolution images, the demand for the projector capable of displaying higher-resolution images with higher brightness has been increasing. As a measure for making the display image high-resolution, there can be cited increase in the number of pixels of the light modulation element such as a liquid crystal light valve. However, if the number of pixels is increased without changing the pixel size, the size of the light modulation element increases, and the manufacturing cost rises significantly. In addition thereto, since the size of the optical system treating the image light emitted from the light modulation element is also increased, the significant rise in the manufacturing cost is unavoidable. By contraries, if it is attempted to increase the number of pixels without changing the size of the light modulation element, it is required to reduce the pixel size. However, the miniaturization of the switching elements and the wiring in the light modulation element are difficult and have limitations. Therefore, the aperture ratio is degraded with the reduction of the pixel size, and the light intensity of the image light is lowered, which results in dark display images.

Therefore, there has been proposed a measure for increasing the apparent number of pixels using an optical method without increasing the physical number of pixels of the light modulation element to thereby achieve high-resolution display images (see JP-A-8-29779 (Document 1)). In the display device described in Document 1, there is adopted a configuration of disposing a polarization rotation element and a birefringent optical element on the exit side of the liquid crystal display (LCD) for generating the image light to thereby shift the light path of the image light transmitted through these elements. In Document 1 mentioned above, there is a description that the high-resolution image display becomes possible even with the low-resolution display element by shifting the light path of the image light between the fields consecutive on the time axis and then displaying the images at different positions to thereby double the apparent number of pixels.

Incidentally, the light modulation element (hereinafter referred to as a liquid crystal light modulation element) using the liquid crystal is generally not provided with an image memory for holding the image data pixel by pixel. Therefore, in the liquid crystal light modulation element, there is generally adopted a method in which the image data is sequentially written line by line to finally form a image corresponding to one frame, a so-called line sequential method. In other words, in the display image, the image of the present sub-frame is always rewritten with the image of the succeeding sub-frame line by line. Therefore, in the images formed by the liquid crystal light modulation element, each of the images includes both of the image of the present sub-frame and the image of the newly rewritten successive sub-frame at a certain time point.

In the display device described in Document 1 mentioned above, the polarization plane of the image light emitted from the LCD is rotated throughout the entire image in a lump at predetermined timing field by field using the polarization rotation element. In this case, it is not achievable to synchronize the operation of continuously rewriting the image data line by line by the LCD and the operation of simultaneously shifting the light path of the image light throughout the entire image at certain timing with the polarization rotation element and the birefringent optical element with each other. Therefore, it is not achievable to realize the high resolution throughout the entire area of the image, and the image becomes partially redundant to cause degradation in the image quality.

Further, in Document 1 described above, there is a description that the advantage of increase in the number of pixels can be enhanced by dividing the electrode of the ferroelectric liquid crystal cell constituting the polarization rotation element into two or more (specifically five) line electrodes to make it possible to shift the light path of the image light for each of the areas corresponding respectively to the line electrodes. However, the image light emitted from the LCD is diverging light, and the light beam diameter is significantly expanded when the image light enters the polarization rotation element disposed distant from the LCD. Therefore, even if the division number of the electrode of the polarization rotation element is made equal to the number of lines of the pixels of the LCD, it is not achievable to conform the boundary between the image of the present sub-frame and the image of the subsequent sub-frame to the boundary between the areas having respective polarization planes different from each other. Therefore, it is not achievable to make the image high-resolution throughout the entire area thereof, and therefore, it is not achievable to sufficiently avoid the degradation of the image quality.

It should be noted that in the explanation described above, there is cited the example of the line sequential method, which is a typical writing method of the image data in the liquid crystal light modulation element. However, in some cases, there might be adopted a method of sequentially rewriting the image data pixel by pixel, namely a so-called dot sequential method in the liquid crystal light modulation element. The problem described above is also common to the projectors adopting the dot sequential method.

SUMMARY

An advantage of some aspects of the invention is to provide a projector capable of achieving the high resolution throughout the entire area of the image by increasing the apparent number of pixels by an optical method without increasing the physical number of pixels of the light modulation element.

An aspect of the invention is directed to a projector including a light source, a light modulation element having a plurality of pixels arranged in a matrix to which a first image data corresponding to a first sub-frame and a second image data corresponding to a second sub-frame temporally contiguous to the first sub-frame are alternately written in a line sequential manner, and adapted to modulate the light from the light source based on one of the first image data and the second image data written to the pixels, a polarization switching element having a plurality of linear switching areas adapted to switch a polarization state of the light input temporally between a first polarization state and a second polarization state, and adapted to switch between the first polarization state and the second polarization state in a line sequential manner throughout the plurality of switching areas, a birefringent optical element adapted to change a light path of a light input from the polarization switching element in accordance with the polarization state to thereby emit the light from a different position, a light transmission optical system adapted to transmit the light modulated by the light modulation element to the polarization switching element, and to roughly image the light in the polarization switching element to form an intermediate image, a projection optical system adapted to project the intermediate image formed in the polarization switching element, and a control section adapted to control the polarization switching element, wherein the control section switches between the first polarization state and the second polarization state in a line sequential manner so that a boundary position between the switching area of the polarization switching element set to the first polarization state and the switching area set to the second polarization state moves roughly in sync with a movement of a boundary position on the intermediate image corresponding to a boundary position between an area on the light modulation element to which the first image data is written and an area to which the second image data is written.

That is, the projector according to this aspect of the invention is provided with a light transmission optical system, and the light transmission optical system transmits the emission light from the light modulation element to the polarization switching element, and then roughly images the light in the polarization switching element to form the intermediate image. Thus, even if the light modulation element and the polarization switching element are located distantly from each other, and the emission light from the light modulation element is diverging light, it is possible to input the projection light, which is emitted from the predetermined pixel of the light modulation element, to the predetermined place of the polarization switching element with accuracy. Further, the polarization switching element is controlled by the control section, and switches between the first polarization state and the second polarization state in a line sequential manner so that a boundary position between the switching area of the polarization switching element set to the first polarization state and the switching area set to the second polarization state moves roughly in sync with a movement of a boundary position on the intermediate image corresponding to a boundary position between an area on the light modulation element to which the first image data is written and an area to which the second image data is written. Thus, it is possible to surely synchronize the rewriting of the respective image data in the light modulation element and the switching of the polarization state in the polarization switching element with each other spatially and temporally. Further, when the light emitted from the polarization switching element is input to the birefringent optical element, the light path is changed in accordance with the polarization state of the light, and in each sub-frame, the image light is emitted from the different position of the birefringent optical element to thereby increase the apparent number of pixels. In such a manner as described above, the high-resolution projection image can be obtained throughout the entire area of the screen.

In the projector according to this aspect of the invention, it is also possible to adopt the configuration in which the number of the switching areas in the polarization switching element and the number of rows of the pixels in the light modulation element are equal to each other.

According to this configuration, the pixel groups in the row direction along which the image data is written in the light modulation element and the linear switching areas in the polarization switching element correspond one-to-one to each other. In this case, the boundary position of the image data writing in the light modulation element and the boundary position of the polarization state switching in the polarization switching element can almost completely be synchronized with each other spatially and temporally. Therefore, the further high-resolution image can be obtained throughout the entire area of the screen.

In the projector according to this aspect of the invention, it is also possible to adopt the configuration in which the number of the switching areas in the polarization switching element is smaller than the number of rows of the pixels in the light modulation element.

In the case of this configuration, the pixel groups in the row direction along which the image data is written in the light modulation element and the linear switching areas in the polarization switching element fail to correspond one-to-one to each other. Therefore, the boundary position of the image data writing in the light modulation element and the boundary position of the polarization state switching in the polarization switching element cannot completely be synchronized with each other. Therefore, since the polarization state of the image light is locally disturbed, namely the predetermined polarization state is not obtained, it results that the high-resolution projection image due to the increase in the apparent number of pixels is not locally achieved. However, if the size of the area where the disturbance in the polarization state occurs, namely the area where the high resolution is not achieved, is extremely small compared to the size of the overall image, no substantial problem practically arises. Further, according to this configuration, the drive element and the drive circuit of the polarization switching element can be simplified, and cost reduction can be achieved.

In the projector according to this aspect of the invention, it is also possible to adopt the configuration in which the number of the switching areas in the polarization switching element is larger than the number of rows of the pixels in the light modulation element.

In the case of this configuration, a plurality of switching areas in the polarization switching element corresponds to one pixel group in the row direction along which the image data is written in the light modulation element. For example, in the case of using the liquid crystal element as the light modulation element, depending on the liquid crystal element, there is a case in which it takes a longtime to rewrite the image data, namely the response time is long, depending on the structure of the element, the physicality of the liquid crystal, and so on. In such a case, by making the plurality of switching areas of the polarization switching element correspond to the transition period of rewriting of the image data and performing fine switching, for example, it is possible to control the polarization state of the image light to be the predetermined polarization state with high accuracy, and it is possible to obtain the high-resolution projection image with the apparent number of pixels appropriately increased.

Another aspect of the invention is directed to a projector including a light source, a light modulation element having a plurality of pixels arranged in a matrix to which a first image data corresponding to a first sub-frame and a second image data corresponding to a second sub-frame temporally contiguous to the first sub-frame are alternately written in a dot sequential manner, and adapted to modulate the light from the light source based on one of the first image data and the second image data written to the pixels, a polarization switching element having a plurality of switching areas adapted to switch a polarization state of the light input temporally between a first polarization state and a second polarization state, and adapted to switch between the first polarization state and the second polarization state in a dot sequential manner throughout the plurality of switching areas, a birefringent optical element adapted to change a light path of a light input from the polarization switching element in accordance with the polarization state to thereby emit the light from a different position, a light transmission optical system adapted to transmit the light modulated by the light modulation element to the polarization switching element, and to roughly image the light in the polarization switching element to form an intermediate image, a projection optical system adapted to project the intermediate image formed in the polarization switching element, and a control section adapted to control the polarization switching element, wherein the control section switches between the first polarization state and the second polarization state in a dot sequential manner so that a boundary position between the switching area of the polarization switching element set to the first polarization state and the switching area set to the second polarization state moves roughly in sync with a movement of a boundary position on the intermediate image corresponding to a boundary position between an area on the light modulation element to which the first image data is written and an area to which the second image data is written.

In contrast to the fact that the projector described above adopts the line sequential image data writing, the projector of this aspect of the invention adopts the dot sequential image data writing. Also in this projector, since the writing of the respective image data in the light modulation element and the switching of the polarization state in the polarization switching element can be synchronized with each other spatially and temporally, the polarization state of the image light can be controlled to be the predetermined polarization state with high accuracy, and the high-resolution projection image with the apparent number of pixels appropriately increased can be obtained throughout the entire area of the screen.

In the projector according to this aspect of the invention, it is preferable that the light transmission optical system has a telecentric property on at least a side of the light modulation element. It is further preferable that the telecentric property is provided to both of the side of the light modulation element and the side of the polarization switching element.

The optical system having the telecentric property denotes the optical system in which the principal light beam passes through the image-side focal point or the object-side focal point. By using the light transmission optical system formed of such an optical system, the size and the shape of the image transmitted do not change even if the position shift in the light axis direction is caused in the light modulation element or the polarization switching element. Therefore, positioning between the light modulation element and the polarization switching element is easy, and therefore, accurate transmission of the image can be realized.

In the projector according to this aspect of the invention, it is possible to adopt the configuration in which the light transmission optical system is a same-size transmission optical system.

According to this configuration, by using the polarization switching element having the polarization switching areas having the same size and the same shape as those of the pixel area of the light modulation element, accurate image transmission can be realized.

In the projector according to this aspect of the invention, it is possible to adopt the configuration in which the light transmission optical system is a contraction transmission optical system.

According to this configuration, the polarization switching element and the projection optical system can be miniaturized, and it is easy to achieve downsizing and cost reduction of the overall projector.

In the projector according to this aspect of the invention, it is possible to adopt the configuration in which the light transmission optical system is an expansion transmission optical system.

According to this configuration, positioning between the intermediate image transmitted to the polarization switching element and the polarization switching element becomes easy, and it is easy to assure the positional accuracy of the polarization switching element.

In the projector according to this aspect of the invention, it is possible to adopt the configuration in which there is further provided a polarization compensation optical system disposed on a light path between the light transmission optical system and the polarization switching element, and adapted to compensate disturbance of the polarization state. Alternatively, there is further provided a polarization element of one of a light absorbing type and a light reflecting type disposed on an entrance side of the polarization switching element.

According to these configurations, since the polarization degree of the polarized light entering the polarization switching element can be enhanced, the polarization state of the image light can correctly be switched by the polarization switching element, and thus the high-resolution image display superior in image quality can be realized.

BRIEF DESCRIPTION OF THE DRAWINGS

The invention will be described with reference to the accompanying drawings, wherein like numbers reference like elements.

FIGS. 4A and 4B are diagrams for explaining an advantage of doubling of the number of pixels due to a birefringent optical element.

DESCRIPTION OF EXEMPLARY EMBODIMENTS

First Embodiment

Hereinafter, a first embodiment of the invention will be explained with reference to FIGS. 1 through 9.

In the present embodiment, a so-called three-panel liquid crystal projector using three sets of transmissive liquid crystal light valves as the light modulation element will be described as an example. Further, the projector according to the present embodiment adopts the line sequential method as the writing method of the image data.

Figure 1:
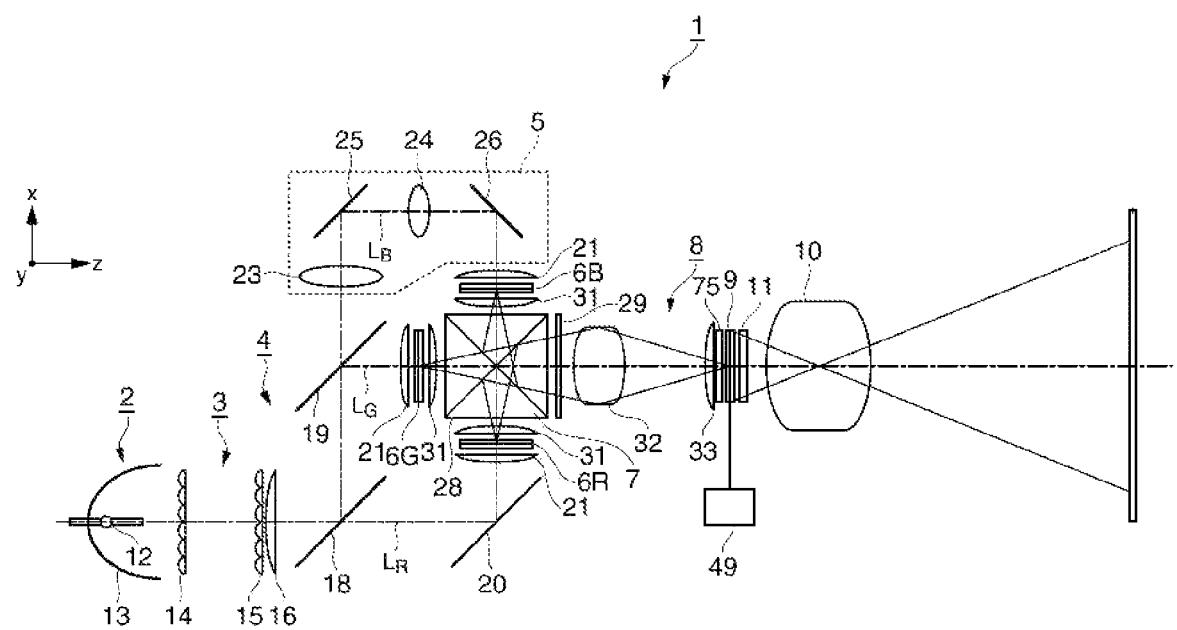
FIG. 1 is a schematic configuration diagram of a projector according to a first embodiment of the invention.
Figure 2A:
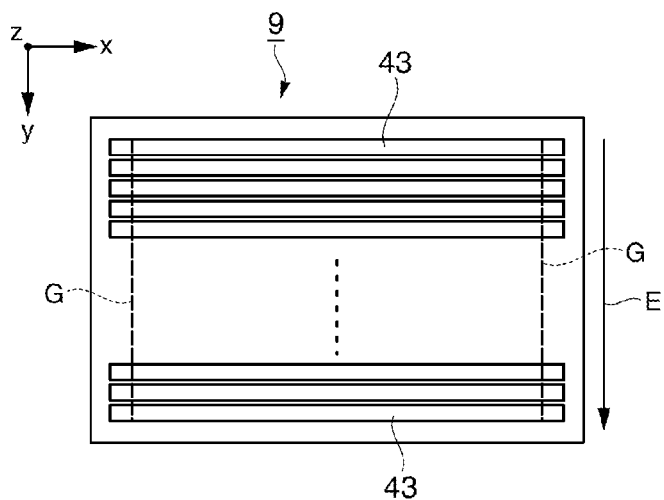
FIGS. 2A and 2B are diagrams showing a polarization switching element of the projector according to the first embodiment.
Figure 2B:
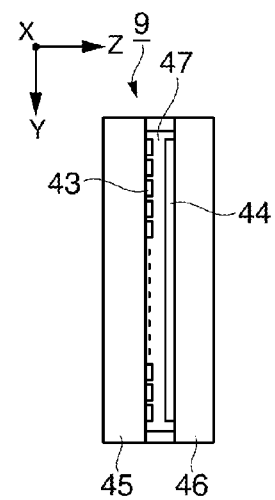
Figure 3A:
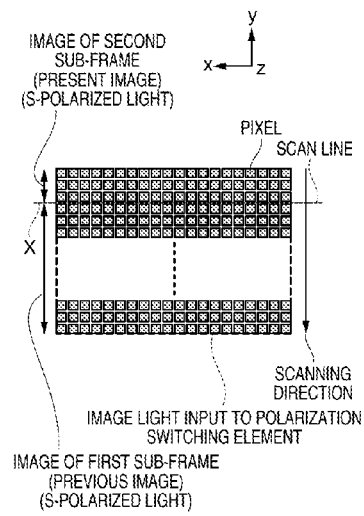
FIGS. 3A through 3C are diagrams for explaining the correspondence between the polarization switching element and the image light.
Figure 3B:
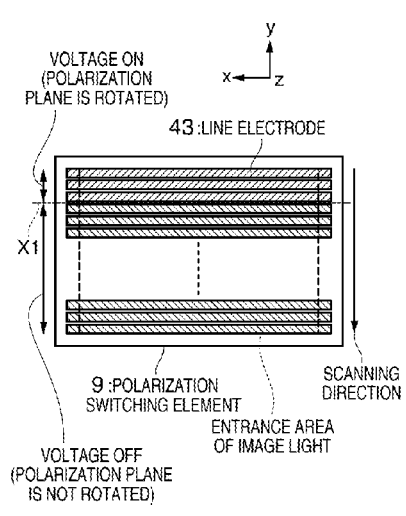
Figure 3C:
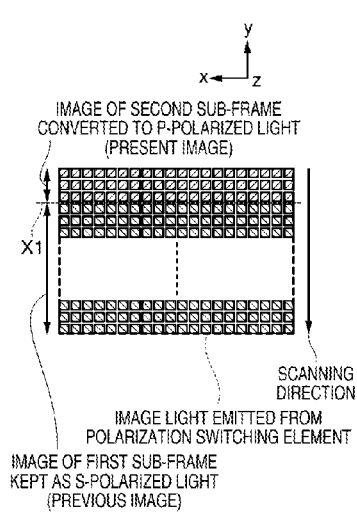
Figure 5A:
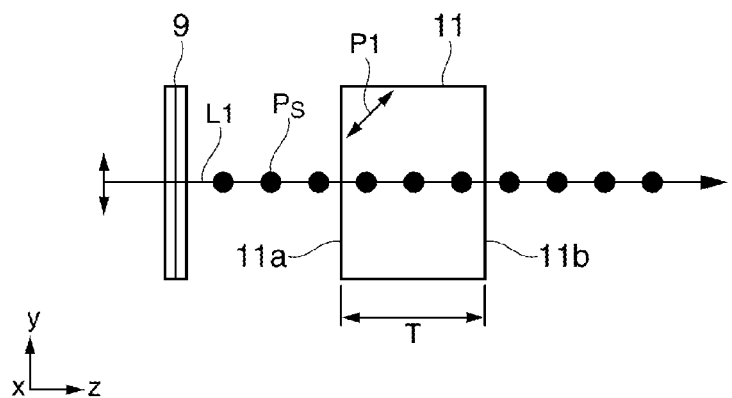
FIGS. 5A and 5B are diagrams for explaining the operation of the birefringent optical element.
Figure 5B:
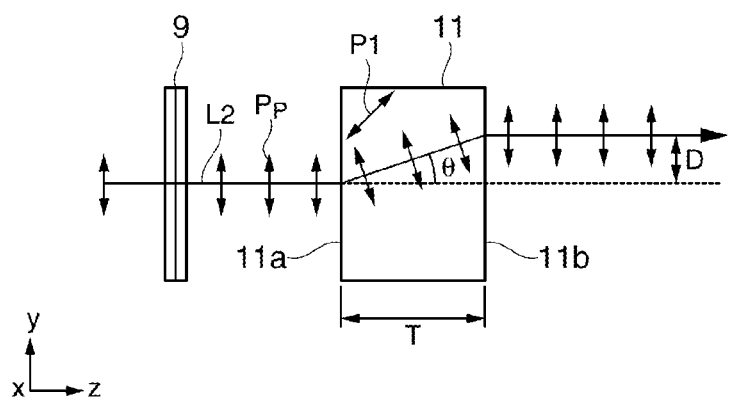
Figure 6A:
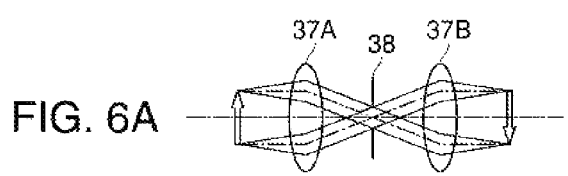
FIGS. 6A through 6E are diagrams showing some configuration examples of a light transmission optical system.
Figure 6D:
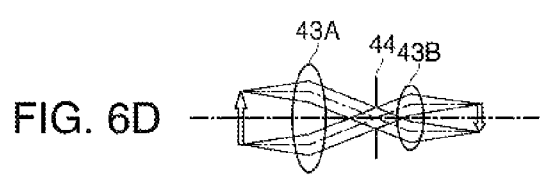
Figure 6B:
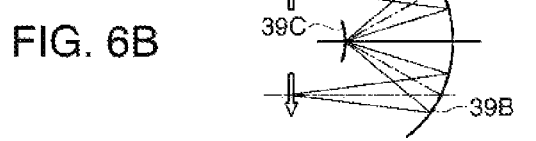
Figure 6E:
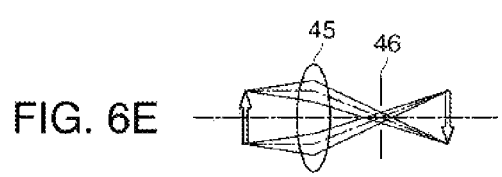
Figure 6C:
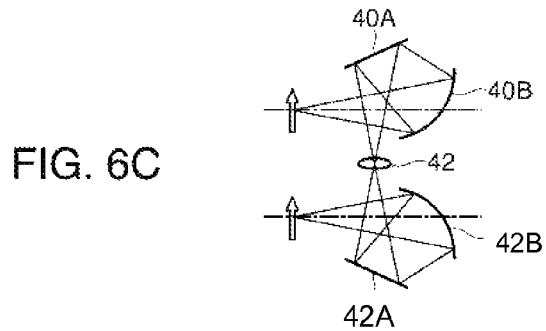
Figure 7:
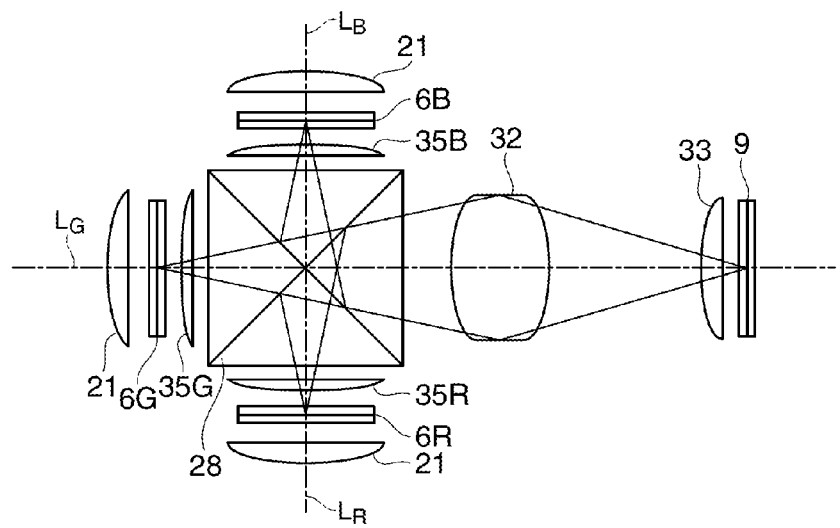
FIG. 7 is a diagram showing a configuration example obtained by adding a light path length correction optical system to the light transmission optical system.
Figure 8:
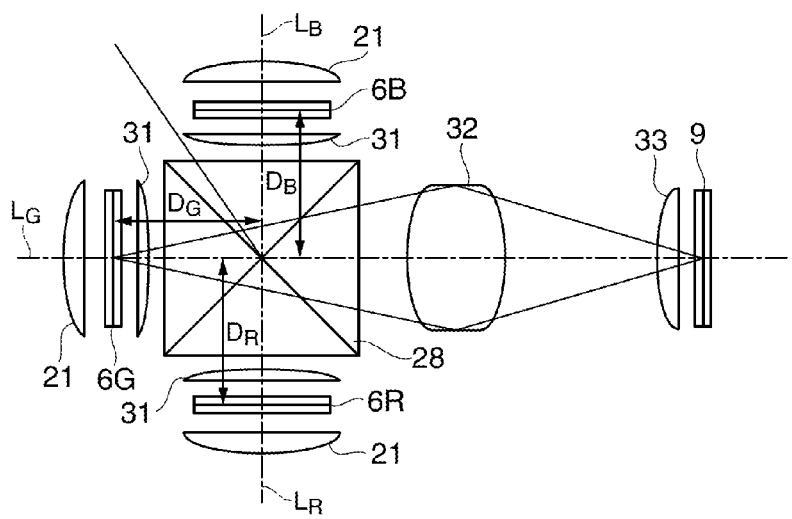
FIG. 8 is a diagram showing another configuration example of correcting the light path length in the light transmission optical system.
Figure 9:
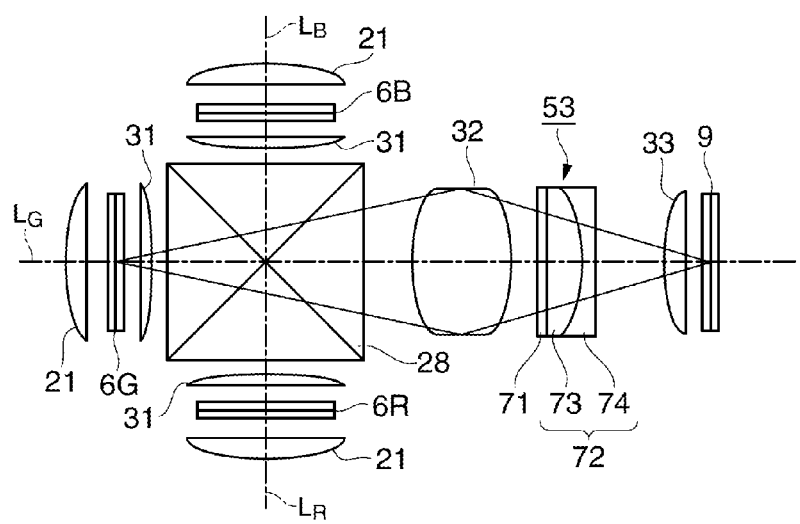
FIG. 9 is a diagram showing a configuration example obtained by adding a polarization compensation optical system to the light transmission optical system.

FIG. 1 is a schematic configuration diagram of the projector according to the present embodiment. FIGS. 2A and 2B are diagrams showing a region-splitting polarization switching element of the projector according to the present embodiment, wherein FIG. 2A is a x-y plan view viewed from the z-axis direction, and FIG. 2B is a cross-sectional view along the y-z plane viewed from the x-axis direction. FIGS. 3A through 3C are diagrams for explaining the correspondence between the region-splitting polarization switching element and the image light. FIGS. 4A and 4B are diagrams for explaining an advantage of doubling of the number of pixels due to a birefringent optical element. FIGS. 5A and 5B are diagrams for explaining an operation of the birefringent optical element. FIGS. 6A through 6E are diagrams showing some configuration examples of a light transmission optical system. FIG. 7 is a diagram showing a configuration example obtained by adding a light path length correction optical system to the light transmission optical system. FIG. 8 is a diagram showing another configuration example of correcting the light path length in the light transmission optical system. FIG. 9 is a diagram showing a configuration example obtained by adding a polarization compensation optical system to the light transmission optical system.

It should be noted that in all of the following drawings, the constituents might be shown with the scale ratios of respective sizes set differently between the constituents in order for facilitating the visualization of each of the constituents.

In the embodiments described below including the present embodiment, as a configuration capable of splitting the light transmission area into a plurality of regions and switching the polarization state of the light passing through the area region by region, there is used a polarization switching element provided with switching elements for switching the polarization state for each of the regions, or a polarization switching element provided with a scanning circuit for sequentially selecting the regions to switch the polarization state outside, namely, a so-called "region-splitting polarization switching element." It should be noted that the region-splitting polarization switching element is simply described as a "polarization switching element."

As shown in FIG. 1, the projector 1 according to the present embodiment is mainly provided with a light source 2, an integrator optical system 3, a color separation optical system 4, a light path length correcting relay optical system 5, three liquid crystal light valves 6R, 6G, and 6B (the light modulation element) for modulating the respective colored light beams, a colored light combining optical system 7, alight transmission optical system 8, a polarization switching element 9, a birefringent optical element 11, and a projection optical system 10. It should be noted that since there exists two light transmission optical systems in the configuration of the present embodiment, one used for the purpose of correcting the light path length of the illumination optical path is referred to as the "light path length correcting relay optical system 5," the other used for the purpose of transmitting the image light generated by the liquid crystal light valves to the polarization switching element is referred to as the "light transmission optical system 8" (corresponding to the "light transmission optical system" of the appended claims) to thereby be distinguished from each other.

Hereinafter, each of the constituents of the projector 1 will be explained.

The light source 2 is formed of a super high-pressure mercury lamp, a xenon lamp, or the like, and is provided with alight source lamp 12 for emitting white light, and a reflector 13 for reflecting the light from the light source lamp 12 to thereby emit the light toward the integrator optical system 3. The integrator optical system 3 has first and second lens arrays 14, 15 each formed of a fly-eye lens or the like, and an overlapping lens 16. The integrator optical system 3 has a function of roughly homogenizing the illuminance distribution of the light emitted from the light source 2 on each of the liquid crystal light valves 6R, 6G, and 6B.

The color separation optical system 4 has dichroic mirrors 18, 19, and a reflecting mirror 20. The dichroic mirrors 18, 19 are each obtained by, for example, stacking a dielectric multilayer film on a glass surface, and have a characteristic of selectively reflecting the colored light in a predetermined wavelength band included in the white light input thereto and transmitting the colored light in the other wavelength band. The dichroic mirror 18 reflects the green light LG and the blue light LB while transmitting the red light LR. The dichroic mirror 19 reflects the green light LG while transmitting the blue light LB out of the colored light reflected by the dichroic mirror 18. The reflecting mirror 20 reflects the red light LR transmitted through the dichroic mirror 18 toward a collimating lens 21 of the red light modulating liquid crystal light valve 6R.

The light path length correcting relay optical system 5 has an entrance side lens 23, a relay lens 24, reflecting mirrors 25, 26, and has a function of correcting the light loss due to the fact that the blue light LB has a light path to the liquid crystal light valve 6B longer than the other colored light LR, LG. The entrance side lens 23 has a function of efficiently inputting the light to the relay lens 24. The relay lens 24 has a function of transmitting the light in the vicinity of the entrance side lens 23 to the blue light modulating liquid crystal light valve 6B via the collimating lens 21. Due to the light path length correcting relay optical system 5, the blue light LB input to the entrance side lens 23 is transmitted to the spatially separated liquid crystal light valve 6B in the condition in which the light intensity distribution is roughly maintained without substantial light loss.

The liquid crystal light valves 6R, 6G, and 6B each have a configuration having a plurality of pixels arranged in a matrix each provided with a pair of substrates and a liquid crystal held between the substrates, and having the transmittance independently controllable. A plurality of scan lines and a plurality of data lines are disposed in the light transmissive area so as to intersect with each other to thereby supply the plurality of data lines with the image data, while scanning the plurality of scan lines from one side to the other side in a line sequential manner to thereby write the image data into the plurality of pixels (a pixel group) arranged in a row direction corresponding to the respective scan lines. For example, the liquid crystal light valve 6R for the red light modulation performs the light modulation on the red light, which is input thereto after being roughly collimated by the collimating lens 21, based on the image data to thereby emit the image light including the optical image. The operations of the green light modulating liquid crystal light valve 6G and the blue light modulating liquid crystal light valve 6B are substantially the same as that of the red light modulating liquid crystal light valve 6R.

In the case of the present embodiment, the image data is written in each of the two sub-frames in a line sequential manner. In the explanation below the image data corresponding to the first sub-frame is referred to as "first image data" and the image data corresponding to the second sub-frame (the sub-frame temporally contiguous to the first sub-frame) following the first sub-frame is referred to as "second image data." In other words, the first image data is written into the first sub-frame (the first period) in a line sequential manner, and the second image data is written into the second sub-frame (the second period), which is the sub-frame following the first sub-frame, in a line sequential manner. The liquid crystal light valves 6R, 6G, and 6B each perform light modulation based on the first image data or the second image data thus written.

The image due to the first image data and the image due to the second image data are projected at the respective positions shifted a half pitch of the pixels in the column direction (the direction in which the data lines extend) from each other as described later, and thus the image corresponding to one frame having the number of pixels doubled is formed with these two images. In other words, the one frame is constituted by the first sub-frame and the second sub-frame. Further, it is preferable to set the display frequency of the frame to 60 Hz, and the display frequency of the sub-frame to 120 Hz. The reason therefor is that if the display frequencies are lower than the above, the observer might feel the flicker leading to deterioration of the image quality when observing the projected image.

The colored light combining optical system 7 has a cross dichroic prism 28 and a wavelength-selective phase plate 29. The cross dichroic prism 28 has a structure having four triangular prisms bonded to each other. The surfaces bonded to each other in the triangular prisms form the selective reflecting planes of the cross dichroic prism 28. The selective reflecting plane for reflecting the red light LR and transmitting the green light LG and the selective reflecting plane for reflecting the blue light LB and transmitting the green light LG are formed perpendicular to each other inside the cross dichroic prism 28. The green light LG having entered the cross dichroic prism 28 is directly emitted after passing through the selective reflecting plane while the red light LR and the blue light LB are selectively reflected by the selective reflecting planes, and then emitted in the same direction as the emission direction of the green light LG.

The wavelength-selective phase plate 29 is for selectively converting the polarization state of the colored light in the specified wavelength band out of the incident light, and ColorSelect® (the trade name of ColorLink Inc.), for example, can be used therefor. Specifically, the image light emitted from each of the liquid crystal light valves 6R, 6G, and 6B is linearly polarized light transmitted through the exit side polarization plate (not shown), and considering the efficiency in the cross dichroic prism 28 as the colored light combining optical system 7, the green light LG enters the cross dichroic prism 28 in the state of P-polarized light and the red light LR and the blue light LB enter the cross dichroic prism 28 in the state of S-polarized light, and then the green light LG, the red light LR, and the blue light LB are emitted after combined into the image light forming a color image. The image light emitted from the cross dichroic prism 28 enters the wavelength-selective phase plate 29, then only the polarization direction of the green light LG is rotated 90 degrees to form the S-polarized light, and thus the image light is converted into the image light composed of three colored lights in the same polarization state, and then emitted from the wavelength-selective phase plate 29. In the case of making the polarization state the same between all of the colored lights as described above, it is easy to uniform the transmission characteristics between the colored lights in the light transmission optical system 8 described later, and it is easy to realize the high transmission efficiency. It is obvious that it is also possible to adopt a configuration in which the colored lights LR, LG, and LB emitted from the respective liquid crystal light valves 6R, 6G, and 6B after transmitted through the respective exit side polarization plates (not shown) become the linearly polarized lights in the same polarization state (e.g., the S-polarized light). In such a case, the wavelength-selective phase plate 29 is unnecessary.

The light transmission optical system 8 has entrance side lenses 31, a relay lens 32, and an exit side lens 33. The light transmission optical system 8 has a function of transmitting the image light, which is emitted from the respective liquid crystal light valves 6R, 6G, and 6B, to the polarization switching element 9, and then focusing it in the polarization switching element 9 to thereby form an intermediate image. Although the light transmission optical system 8 of the present embodiment adopts a same-size transmission optical system, a contraction transmission optical system or an expansion transmission optical system can also be adopted. The imaging magnification of the light transmission optical system 8 will be described later.

The entrance side lens 31 is disposed between each of the liquid crystal light valves 6R, 6G, and 6B and the cross dichroic prism 28. The entrance side lens 31 has a function of efficiently inputting the image light from each of the liquid crystal light valves 6R, 6G, and 6B into the relay lens 32. The relay lens 32 has a function of transmitting the image lights in the vicinity of the entrance side lenses 31 so as to be imaged on the polarization switching element 9 while being combined into the single image light via the cross dichroic prism 28 to thereby form the intermediate image. It should be noted that since the colored light combining characteristics of the cross dichroic prism 28 have the incident angle dependency, it is also possible to dispose a single entrance side lens close to the exit end surface of the cross dichroic prism 28 without disposing the entrance side lenses 31 on the exit side of the respective liquid crystal light valves 6R, 6G, and 6B. If such a configuration is adopted, the color variation apt to occur when combining the colored lights can be reduced. The exit side lens 33 has a function of efficiently inputting the image light, which is emitted from the relay lens 32, into the polarization switching element 9.

The light transmission optical system 8 is preferably an optical system with little chance of generating the optical aberration such as distortion or chromatic aberration of magnification, and the same can be applied to the relay lens 32. From this point of view, it is effective to adopt the measure such as configuring the relay lens 32 with a plurality of lenses, using an aspherical lens, or using a low-dispersive glass material. Further, the configuration is not limited to the lens, but a configuration of using a reflecting mirror or a configuration of combining the lens and the reflecting mirror can also be adopted. It should be noted that although the entrance side lenses 31 and the exit side lens 33 are effective for improving the light transmission efficiency, but are not the essential optical elements, and can therefore be eliminated depending on the characteristics of the image light emitted from the liquid crystal light valves 6R, 6G, and 6B or the configuration of the light transmission optical system.

Although it is stated that the light transmission optical system 8 is preferably an optical system with little chance of generating the optical aberration, more specifically, it is preferably an optical system having the image transmission characteristics with little wavelength dependency. The reason therefor is that the red light image, the green light image, and the blue light image are formed by the lights in the respective wavelength bands different from each other in the respective liquid crystal light valves 6R, 6G, and 6B, and these images are treated by the same light transmission optical system 8. In order for achieving this, it is preferable to configure it using the optical material with no dispersibility or low dispersibility.

Alternatively, as another measure, it is effective to take a measure such as disposing light path length correction optical system 35 on the exit side of each of the liquid crystal light valves 6R, 6G, and 6B to thereby correct the light path length for each of the light paths as shown in FIG. 7, or varying the distances DR, DG, and DB between the respective liquid crystal light valves 6R, 6G, and 6B and the polarization switching element 9 to thereby correct the light path length for each of the light paths as shown in FIG. 8. FIG. 7 shows the case of using three plano-convex lenses 35R, 35G, and 35B having the respective lens characteristics (e.g., curvature and material) different from each other for the respective light paths as an example of the light path length correction optical system. By optimizing the lens characteristics for each of the light paths, the wavelength dependency when transmitting the image can be reduced. It should be noted that in FIG. 8, in order for making the drawing eye-friendly, the arrows for indicating the distances DR, DG, and DB are drawn from the respective liquid crystal light valves 6R, 6G, and 6B only to the exit light axes.

Further, in the configuration provided with a plurality of liquid crystal light valves, the image lights of the respective liquid crystal light valves 6R, 6G, and 6B need to surely be transmitted to the polarization switching element 9 while being correctly overlapped with each other. In order for achieving this, it is necessary to set the optical distances between the respective liquid crystal light valves 6R, 6G, and 6B and the polarization switching element 9 to a predetermined relationship taking the optical characteristics of the light transmission optical system 8 described above into consideration. In other words, it is necessary to correctly set the positions of the respective liquid crystal light valves 6R, 6G, and 6B in the projection light axis direction. However, this setting is far from easy. Therefore, it is desirable to use a light transmission optical system having a telecentric property on at least one side, namely the side of the liquid crystal light valves 6R, 6G, and 6B, preferably on the both sides, namely the side of the liquid crystal light valves 6R, 6G, and 6B and side of the polarization switching element 9. The optical system having the telecentric property denotes the optical system in which the principal light beam passes through the image-side focal point or the object-side focal point. By using such an optical system, the size and the shape of the image transmitted do not change even if the position shift in the light axis direction is caused in the liquid crystal light valves 6R, 6G, and 6B or the polarization switching element 9. Therefore, positioning between the liquid crystal light valves 6R, 6G, and 6B and the polarization switching element 9 is easy, and the correct image transmission can be realized.

Some examples of the light transmission optical system having the telecentric property described above are shown in FIGS. 6A through 6E. FIG. 6A shows an example of a lens-type both-side telecentric light transmission optical system, which is provided with two lenses 37A, 37B and an optical aperture 38. FIG. 6B shows an example of a mirror-type both-side telecentric light transmission optical system, which is provided with three reflecting mirrors 39A, 39B, and 39C. FIG. 6C shows an example of a lens/mirror combination-type both-side telecentric light transmission optical system, which is provided with two pairs of mirrors 40A, 40B, 42A, 42B and a lens 42. FIG. 6D shows an example of a both-side telecentric contraction transmission optical system, which is provided with two lenses 43A, 43B and an optical aperture 44. FIG. 6E shows an example of an object-side telecentric light transmission optical system, which is provided with a lens 45 and an optical aperture 46.

It should be noted that the cross dichroic prism 28 is also desirably made to be an element with little chance of generating the optical aberration similarly to the light transmission optical system 8, and is desirably configured using the optical material with no dispersibility or low dispersibility.

The polarization switching element 9 has a plurality of linear switching areas for temporally switching the polarization state of the light input from the liquid crystal light valves 6R, 6G, and 6B between the S-polarized light (a first polarization state) and the P-polarized light (a second polarization state), and is for switching between the S-polarized light and the P-polarized light in a line sequential manner throughout the plurality of switching areas. As shown in FIGS. 2A and 2B, the polarization switching element 9 is composed of a liquid crystal element having a liquid crystal 47 encapsulated between a pair of transparent substrates 45, 46 respectively provided with transparent electrodes 43, 44 in a predetermined orientational state. In the present embodiment, the polarization switching element 9 needs to input a linearly polarized light and then emit another linearly polarized light different from the input linearly polarized light, and therefore needs to function as a ½ waveplate. Therefore, as the types of the liquid crystal element applicable to the polarization switching element 9, there can be cited the liquid crystal elements such as a pi-cell liquid crystal element, a ferroelectric liquid crystal element, or a TN liquid crystal element. Further, it is desirable to use a liquid crystal element with the response speed as high as possible for the polarization switching element 9.

One transparent substrate 45 is provided with a plurality of line electrodes 43 having an elongated shape formed of a transparent electrically conductive film. The forming areas of the respective line electrodes 43 correspond to the switching areas for temporally switching the polarization state of the incident light between the S-polarized light and the P-polarized light. The size and the shape of each of the line electrodes 43 (the switching areas) correspond respectively to the size and the shape of all of the plurality of pixels arranged in the row direction (the direction in which the scan line extends) of each of the liquid crystal light valves 6R, 6G, and 6B. Further, the number of line electrodes 43 (the switching areas) is equal to the number of pixels (the number of rows) arranged in the column direction (the direction in which the data line extends) of each of the liquid crystal light valves 6R, 6G, and 6B. The other transparent substrate 46 is provided with the opposed electrode 44 formed of a transparent electrically conductive film formed on the entire surface thereof.

The size of the line electrode 43 in the row direction is set slightly larger than the dimension between the both ends of all of the pixels arranged in the row direction of each of the liquid crystal light valves 6R, 6G, and 6B. Therefore, as shown in FIG. 2A, the area G where the image lights from the liquid crystal light valves 6R, 6G, and 6B are transmitted is located on the inner side of the both longitudinal ends of the line electrode 43. It is desirable that the polarization switching element 9 is held by a holder (a holding member) capable of adjusting the position in all directions, namely the x-axis direction, the y-axis direction, and the z-axis direction. The light transmission optical system 8 is required to accurately transmit the images of the liquid crystal light valves 6R, 6G, and 6B to predetermined positions of the polarization switching element 9 so that the pixel group arranged in the row direction of the image provided to each of the liquid crystal light valves 6R, 6G, and 6B and the line electrodes 43 of the polarization switching element 9 correspond one-to-one to each other. In this case, since the position adjusting mechanism (the holding member) described above is provided, position adjustment of the light transmission optical system 8 and the polarization switching element 9 become easy.

As shown in FIG. 1, the polarization switching element 9 is provided with a control section 49 including a drive element and a drive circuit (both not shown). The control section 49 sequentially applies the voltage between the line electrode 43 and the opposed electrode 44 of the polarization switching element 9 in sync with the line sequential scanning in the vertical direction of the liquid crystal light valves 6R, 6G, and 6B to thereby control the orientational state of the liquid crystal in the individual switching area held between the line electrode 43 and the opposed electrode 44. Thus, it becomes possible to switch the polarization state of the polarized light input to the switching area corresponding to the specified light electrode 43 from the S-polarized light to the P-polarized light in a line sequential manner, and then emit it while scanning in the direction of the arrow E shown in FIG. 2A, for example. Obviously, it is also possible to adopt a configuration of inputting the P-polarized light to the polarization switching element 9, and in such a case, the polarization state of the polarized light input to the switching area is switched from the P-polarized light to the S-polarized light. Specifically, it is possible to rotate the polarization direction of the S-polarized light (or the P-polarized light) as the linearly polarized light 90 degrees to thereby output it as the P-polarized light (or the S-polarized light) when inputting the S-polarized light (or the P-polarized light) to the polarization switching element 9, or to directly emit it as the S-polarized light (or the P-polarized light) without rotating the polarization direction.

In many liquid crystal light valves, the line sequential image data writing is adopted. Specifically, the image data is written into all of the pixels arranged in the row direction as the pixel group simultaneously, and then the pixel group sequentially moves in the column direction, and thus the image data is written into all of the pixels to finally complete the image corresponding to one sub-frame. Therefore, the polarization switching element 9 is configured so as to correspond to the line sequential writing method of the liquid crystal light valves 6R, 6G, and 6B, and so that one of the line electrodes 43 corresponds to all of the pixels arranged in the row direction, namely the pixel group.

How the image lights from the liquid crystal light valves 6R, 6G, and 6B input to the polarization switching element 9 are converted into the image light having a predetermined polarization state by the polarization switching element 9 will hereinafter be explained with reference to FIGS. 3A through 3C.

It should be noted that FIG. 3A shows the state of the image light input to the polarization switching element 9, FIG. 3B shows the state of the polarization switching element 9, and FIG. 3C shows the state of the image light emitted from the polarization switching element 9.

Getting an up-close look at the image light input to the polarization switching element 9, the image is continuously rewritten line by line in accordance with the image data writing in the line sequential scanning in the vertical direction of the liquid crystal light valves 6R, 6G, and 6B. In other words, as shown in FIG. 3A, in the intermediate image formed by the image light input to the polarization switching element 9, both of the image (the previous image) of the first sub-frame (the previous sub-frame) and the image (the present image) of the second sub-frame (the present sub-frame) newly rewritten are existing on both sides of a predetermined scan line (a predetermined boundary position X) at a certain time point. It should be noted that the image lights respectively constituting the image of the first sub-frame and the image of the second sub-frame are both the S-polarized light in this stage.

Here, as shown in FIG. 3B, the control section 49 applies a predetermined voltage to the plurality of line electrodes 43 of the polarization switching element 9 in a line sequential manner, and sequentially switches the orientational state of the liquid crystal to a predetermined state so that the boundary position X1 between the switching area where the polarization state of the liquid crystal is in the S-polarization state and the switching area where the polarization state is in the P-polarization state moves in sync with the vertical movement of this scan line (the boundary position X). Here, the voltage of the line electrodes 43 lower than the boundary position X1 is set to OFF to thereby emit the S-polarized light input to the switching area directly as the S-polarized light without rotating the polarization direction. On the other hand, the voltage of the line electrodes 43 higher than the boundary position X1 is set to ON to thereby rotate the polarization direction of the S-polarized light input to the switching area, and then emit it as the P-polarized light.

Thus, as shown in FIG. 3C, the image light transmitted through the polarization switching element 9 can take the polarization state different between the upper and lower areas of the boundary position X1, and it is prevented that the same polarization state continues straddling the scan line (the boundary position X) in FIG. 3A. For example, as shown in FIG. 3C, the image of the first sub-frame is emitted directly keeping the S-polarization state without changing the polarization state while the image of the second sub-frame is converted in the polarization state, and is emitted as the P-polarized light. It should be noted that in the polarization switching element 9 it is possible to adopt either one of the type of converting the polarization state of the polarized light transmitted therethrough when the voltage is ON and the type of converting the polarization state of the polarized light transmitted therethrough when the voltage is OFF depending on the configuration thereof. Which one of the types is adopted can be determined by selecting an appropriate type based on the polarization state of the image light input to the polarization switching element 9 and the positional relationship with the optical axis of the birefringent optical element 11 described later.

The birefringent optical element 11 is formed of, for example, calcite, a quartz crystal, a liquid crystal cell having the liquid crystal oriented, an oriented body of a polymeric material, and is provided with the refractive index anisotropy. Specifically, the birefringent optical element 11 develops the refractive operation different in accordance with the polarization state of the light to be input. Due to the operation described above, the birefringent optical element 11 changes the light path of the light input from the polarization switching element 9 in accordance with the polarization state, and then outputs the light thus input thereto from the different position of the exit end surface. It should be noted that although in FIG. 1 the polarization switching element 9 and the birefringent optical element 11 are drawn separately from each other from the viewpoint of eye-friendliness of the drawing, since the intermediate image by the image lights from the respective liquid crystal light valves 6R, 6G, and 6B is imaged on the polarization switching element 9, it is desirable to dispose the birefringent optical element 11 in the immediate vicinity of, for example, closely to the polarization switching element 9. Thus, since the light path can be changed in the immediate vicinity of the intermediate image, the deterioration of the image quality when displaying by projection can be prevented, and thus the high quality high-resolution image display can be realized.

Here, the behavior of the image light input to the birefringent optical element 11 will be explained with reference to FIGS. 5A and 5B. In FIGS. 5A and 5B, it is assumed that the optical axis P1 of the birefringent optical element 11 is disposed in a plane parallel to the sheet of the drawing. Further, in FIG. 5A, the polarized light L1 entering the birefringent optical element 11 is the S-polarized light, and the polarized direction Ps is perpendicular to the sheet of the drawing. In FIG. 5B, the polarized light L2 entering the birefringent optical element 11 is the P-polarized light, and the polarized direction Pp is parallel to the sheet of the drawing.

As shown in FIG. 5A, if the optical axis P1 of the birefringent optical element 11 does not exist inside the polarization plane (the plane including the polarization direction Ps and the center axis of the incident light) of the polarized light L1 input thereto, the polarized light L1 input thereto is emitted without changing the light path thereof. On the other hand, as shown in FIG. 5B, if the optical axis P1 of the birefringent optical element 11 exists inside the polarization plane (the plane including the polarization direction Pp and the center axis of the incident light) of the polarized light L2 input thereto, the polarized light L2 input thereto is emitted with the light path changed in accordance with the deflection angle θ caused by the difference between the ordinary index and the extraordinary index of the birefringent optical element 11. Therefore, in this example, the S-polarized light is emitted without changing the light path thereof, and the P-polarized light is emitted with the light path thereof changed.

Here, if the entrance end surface 11a and the exit end surface 11b of the birefringent optical element 11 with the thickness T are formed in a parallel state, the polarized light entering the entrance end surface 11a is emitted from the exit end surface 11b in the state in which the light path thereof is translated a shift amount D. The shift amount D depends on the deflection angle θ and the thickness T, and is expressed as $D = T \cdot \tan \theta$.

Therefore, when the image light of the first sub-frame is emitted as the S-polarized light in the area lower than the boundary position X1, for example, and the image light of the second sub-frame is emitted as the P-polarized light in the area higher than the boundary position X1 as shown in FIG. 4A, the image of the first sub-frame entering the birefringent optical element 11 in the state of the S-polarized light is emitted without changing the light path thereof as shown in FIG. 4B. In contrast, the image of the second sub-frame entering the birefringent optical element 11 in the state of the P-polarized light is emitted in the state in which the light path thereof is translated the shift amount D. If the shift amount D is set to a half of the pixel pitch in the column direction (the y-axis direction) in the liquid crystal light valves 6R, 6G, and 6B, it results that the image of the first sub-frame and the image of the second sub-frame are displayed at the respective positions shifted a half of the pixel pitch in the column direction (the y-axis direction) of the liquid crystal light valves 6R, 6G, and 6B, namely the vertical direction of the screen, from each other.

It should be noted that although in the present embodiment the image of the first sub-frame and the image of the second sub-frame are not shifted in the horizontal direction (the x-axis direction) of the screen, the image of the first sub-frame and the image of the second sub-frame are drawn in FIG. 4B so as to be shifted also in the horizontal direction (the x-axis direction) of the screen in order for making the drawing eye-friendly.

As described above, according to the projector 1 of the present embodiment, since there is provided the light transmission optical system 8 for imaging the image lights from the liquid crystal light valves 6R, 6G, and 6B on the polarization switching element 9 to thereby form the intermediate image, even in the case in which the liquid crystal light valves 6R, 6G, and 6B and the polarization switching element 9 are distantly located, and the image lights from the liquid crystal light valves 6R, 6G, and 6B are diverging lights, it is possible to make the image light emitted from a predetermined pixel of the liquid crystal light valves 6R, 6G, and 6B enter a predetermined switching area of the polarization switching element 9 with accuracy. Further, since in the polarization switching element 9 the boundary position between the switching area where the polarization state of the liquid crystal is in the S-polarization state and the switching area where the polarization state of the liquid crystal is in the P-polarization state moves in sync with the movement of the boundary position between the images of the respective sub-frames of the liquid crystal light valves 6R, 6G, and 6B in the vertical direction, it is possible to synchronize the writing of the respective image data in the liquid crystal light valves 6R, 6G, and 6B and the switching of the polarization state in the polarization switching element 9 with each other spatially and temporally. According to the above, in the projector 1 of the present embodiment, the high-resolution image display with the apparent number of pixels in the vertical direction (the y-axis direction) of the screen doubled throughout the entire area of the screen can be realized.

Since in the present embodiment the same-size transmission optical system is used as the light transmission optical system 8, by using the polarization switching element 9 having the polarization switching area having the same size and the same shape as those of the pixel area of each of the liquid crystal light valves 6R, 6G, and 6B, accurate image transmission can be realized. However, as the constituent of the light transmission optical system, the contraction transmission optical system or the expansion transmission optical system can be adopted instead of the same-size transmission optical system. Since in the contraction transmission optical system, namely the configuration of contracting the image formed by the liquid crystal light valves 6R, 6G, and 6B and then transmitting it to the polarization switching element 9, the polarization switching element 9, the birefringent optical element 11, the projection optical system 10, and so on can be miniaturized, it is easy to achieve downsizing and cost reduction of the overall projector. In contrast, in the expansion transmission optical system, namely the configuration of expanding the image formed by the liquid crystal light valves 6R, 6G, and 6B and then transmitting it to the polarization switching element 9, the positioning between the intermediate image transmitted to the polarization switching element 9 and the polarization switching element 9 becomes easy, and it is easy to assure the positioning accuracy of the polarization switching element 9.

Since in the case of the present embodiment, the polarization switching element 9 is disposed at the focal position of the projection optical system 10, and no inclusion other than air exists between the polarization switching element 9 and the projection optical system 10, it is possible to use the projection optical system with an extremely short back focus length. The shorter the back focus length becomes, the more easily the high-performance projection optical system despite the small F value and the large diameter can be realized. Therefore, even in the case of setting the magnification ratio of the image transmission in the light transmission optical system 8 to other values than the same size, the projection optical system 10 corresponding to this configuration can be realized with relative ease.

Although it is desirable that the number of line electrodes 43 (the switching areas) of the polarization switching element 9 is equal to the number of pixels arranged in the column direction of the liquid crystal light valves 6R, 6G, and 6B as in the case of the present embodiment, the invention is not limited thereto. If the number of line electrodes 43 (the switching areas) of the polarization switching element 9 is different from the number of pixels arranged in the column direction of the liquid crystal light valves 6R, 6G, and 6B, since the pixel groups in the row direction of the liquid crystal light valves 6R, 6G, and 6B and the switching areas of the polarization switching element 9 fail to correspond one-to-one to each other, the boundary position of each of the image data in the liquid crystal light valves 6R, 6G, and 6B and the boundary position between the polarization states different from each other in the polarization switching element 9 cannot completely be synchronized with each other. Therefore, it results that there occurs some local disturbance (failure in achieving a predetermined polarization state) in the polarization state of the image light such that the light beam, which should originally be emitted as the S-polarized light, is emitted as the P-polarized light in the vicinity of the boundary position. However, if the size of the area where the disturbance in the polarization state occurs, namely the area where the high resolution is not achieved, is extremely small compared to the size of the overall image, no substantial problem practically arises.

Therefore, it is possible to adopt the configuration in which the number of line electrodes 43 (the switching areas) of the polarization switching element 9 is smaller than the number of pixels arranged in the column direction of the liquid crystal light valves 6R, 6G, and 6B. If the number of line electrodes 43 equal to or larger than roughly a half of the number of pixels arranged in the column direction of the liquid crystal light valves 6R, 6G, and 6B are formed, the substantially intended advantage as the polarization switching element 9 can be obtained. In the case of adopting the configuration in which the number of line electrodes 43 (the switching areas) of the polarization switching element 9 is smaller than the number of pixels arranged in the column direction of the liquid crystal light valves 6R, 6G, and 6B, the drive element and the drive circuit of the polarization switching element 9 can be simplified, and the cost reduction can be achieved.

By contraries, it is also possible to adopt the configuration in which the number of line electrodes 43 (the switching areas) of the polarization switching element 9 is larger than the number of pixels arranged in the column direction of the liquid crystal light valves 6R, 6G, and 6B. In the case of adopting this configuration, a plurality of line electrodes 43 (the switching areas) in the polarization switching element 9 corresponds to a row of the pixel group in the row direction in the liquid crystal light valves 6R, 6G, and 6B. For example, depending on the liquid crystal element constituting the light modulation element, there is a case in which it takes a long time to rewrite the image data, namely the response time is long, depending on the structure of the element, the physicality of the liquid crystal, and so on. In such a case, by making the plurality of switching areas of the polarization switching element 9 correspond to the transition period of rewriting of the image data and performing fine switching, for example, it is possible to control the polarization state of the image light to be the predetermined polarization state with high accuracy, and it is possible to obtain the high-resolution projection image with the apparent number of pixels appropriately increased.

Further, in order for correctly switching the polarization state of the image light in the polarization switching element 9, it is desirable that the image light input to the polarization switching element 9 is the linearly polarized light with a high polarization degree. Although the image light emitted from the liquid crystal light valves 6R, 6G, and 6B as the light modulation element is the linearly polarized light with a high polarization degree, the polarization is disturbed by the colored light combining optical system 7 (e.g., the cross dichroic prism having the dichroic films formed of the dielectric multilayer film) and the light transmission optical system 8 (provided with the lenses having curvature) existing in the middle of the path to the polarization switching element 9, and the polarization degree is degraded.

Therefore, as a measure for improving the polarization degree of the image light input to the polarization switching element 9, there can be adopted a configuration of disposing a polarization compensation optical system 53 for compensating the disturbance in the polarization caused by the colored light combining optical system 7 and the light transmission optical system 8 on the light path between the relay lens 32 of the light transmission optical system 8 and the polarization switching element 9 as shown in FIG. 9. In the polarization compensation optical system 53, since the light having unnecessary polarization characteristics is compensated and can be converted without significant light loss in the light having useful polarization characteristics, the degradation of the light intensity of the image light can be suppressed to a small level. According to this configuration, since the polarization degree of the polarized light entering the polarization switching element 9 can be enhanced, the polarization state of the projection light can correctly be switched by the polarization switching element 9, and thus the high-resolution image display superior in image quality can be realized.

As the polarization compensation optical system 53, a well-known rectifier can be used. The rectifier is composed of a ½ waveplate 71 and a lens 72 with no refractive power. The lens 72 with no refractive power is composed of a combination of a pair of convex lens 73 and concave lens 74 each having strong refractive power. The lens 72 with no refractive power is capable of generating the transmittance difference between the P-polarized component and the S-polarized component of the transmitted light beam, and thus rotating the polarization plane. By controlling the curvature radius of the curved surface and the glass refractive index, it is possible to control the degree of the rotation of the polarized light in a wide range. Further, by forming the dielectric multilayer film for generating desired retardation on the surface of the ½ waveplate and each of the surfaces of the lens 72 with no refractive power, the desired retardation can be provided to the transmitted light beam.

The polarization variations generated when the polarized lights of the respective colors emitted from the liquid crystal light valves 6R, 6G, and 6B pass through the cross dichroic prism 28 and the relay lens 32 are not completely equal to each other. In the cross dichroic prism 28, the green light (G light) is transmitted through the R light reflecting surface and the B light reflecting surface. The red light (R light) is reflected on the R light reflecting surface and is transmitted through the B light reflecting surface. The blue light (B light) is transmitted through the R light reflecting surface and is reflected on the B light reflecting surface. Therefore, amounts of the retardation acting on the respective colored lights by the dielectric multilayer films (the R light reflecting dichroic film, the B light reflecting dichroic film) of the R light reflecting surface and the B light reflecting surface are different from each other. Further, in the relay lens 32, the degree of rotation of the polarization plane is different between the colored lights due to the chromatic dispersion of the glass refractive index.

For the reason described above, it is difficult to completely restore the polarization variations by the rectifier throughout the entire wavelength band, and in order for realizing this, increase in size, complication, significant increase in cost of the polarization compensation optical system might be incurred. In this case, it is also possible to configure the rectifier putting weight on, for example, the polarization compensation of the G light having the highest human visibility. Specifically, the dielectric multilayer film of the rectifier and the curvature radius and the glass material of the lens 72 having no refractive power are adjusted so as to minimize the retardation acting on the G light and the rotation of the polarization plane. By performing such a process as described above, it is possible to most effectively compensate the polarization state of the image light while avoiding the increase in size, complication, and increase in cost of the polarization compensation optical system 53 (rectifier) to thereby display the high-resolution image superior in image quality. It should be noted that in the case of using the mercury lamp such as a super high-pressure mercury lamp as the light source 2, it is desirable to minimize the retardation and the polarization plane rotation in the vicinity of the e-ray (546.1 nm) with the highest intensity in the G light wavelength band.

The place where the polarization compensation optical system 53 can be disposed is limited to the position in the posterior area (on the side of the polarization switching element 9) of the point at which the colored lights from the respective liquid crystal light valves 6R, 6G, and 6B are combined by the cross dichroic prism 28 and near to the polarization switching element 9 due to the restrictions of the space. Further, for the reason that the optical characteristics of the dichroic element and so on intervening in the light path are different between the light paths of the red light, green light, and blue light, and the optical material used therefor has the wavelength dispersion property, the degrees of deterioration of the polarization degree in the respective light paths are not uniform. Therefore, it is not achievable to compensate the polarization degree of the image light input to the polarization switching element 9 throughout the entire wavelength band. Therefore, in the present configuration, it is desirable to adopt the measure of setting the polarization compensation amount corresponding to the colored light with the largest drop of the polarization degree. Alternatively, it is desirable to adopt the measure of setting the polarization compensation amount so that the drop in the polarization degree is averaged between the colored lights of the three colors.

It should be noted that although in the present embodiment the dielectric multilayer film for compensating the retardation caused in the cross dichroic prism 28 and the relay lens 32 is formed on at least one surface of the optical element constituting the rectifier, the position where the dielectric multilayer film is formed is not limited to the rectifier, but the rectifier can be formed on the surface of another optical element providing the equivalent function is fulfilled. Specifically, the light exit surface of the cross dichroic prism 28 and each of the lens surfaces of the relay lens 32 can be cited. Further, although the antireflection film is usually formed on such surfaces, it is also possible to effectively generate the retardation by eliminating the antireflection film from at least one of these surfaces.

Further, the position where the rectifier is disposed is not limited to the posterior area (on the light exit side) of the relay lens 32, but can also be the anterior area (on the light entrance side) of the relay lens 32. In this case, for example, it is preferable to dispose the lens 72 with no refractive power in the anterior area, and the ½ waveplate 71 in the posterior area out of the rectifiers shown in FIG. 9.

As described above, by using the polarization compensation optical system 53, the disturbance in the polarization can be compensated with little light loss. In contrast, as shown in FIG. 1, it is also possible to adopt the configuration of disposing the light absorbing or light reflecting polarization element 75 on the entrance side of the polarization switching element 9 without using the polarization compensation optical system 53. As the polarization element 75, a light absorbing polarization element using a stretched film made of a polymer material, a light absorbing polarization element with light absorbing fine particles oriented, a light reflecting polarization element or a light absorbing polarization element using the structural birefringence, and so on can be used. According to these configurations, the disturbance in the polarization can be compensated at low cost.

Here, it is desirable to dispose these polarization elements 75 immediately before (on the side of the liquid crystal light valves 6R, 6G, and 6B) the polarization switching element 9. All of these polarization elements 75 are elements for absorbing or reflecting the light with unnecessary polarization component to thereby eliminate the light. Therefore, the polarization degree of the linearly polarized light entering the polarization switching element 9 can be enhanced, the polarization state of the image light can correctly be switched by the polarization switching element 9, and thus the high-resolution image superior in image quality can be realized.

Further, it is also possible to dispose the polarization element 75 so as to adhere to the entrance end surface of the polarization switching element 9. In particular, using of the light absorbing polarization element 75 is advantageous in the case in which the mounting space is limited. Alternatively, it is also possible to adopt the configuration of using the light reflecting polarization element 75 to eliminate the light with the unnecessary polarization component by transmission, and inputting the image light as the reflected light into the polarization switching element 9.

Second Embodiment

Hereinafter, a second embodiment of the invention will be explained with reference to FIG. 10.

The basic configuration of the projector according to the present embodiment is substantially the same as that of the first embodiment, and only the method of writing the image data in the liquid crystal light valves is different from the first embodiment. Therefore, this point will be explained.

Figure 10:
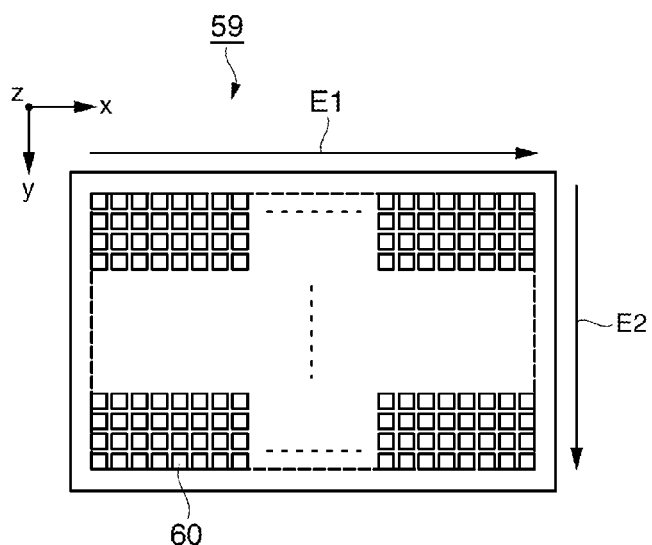
FIG. 10 is a diagram showing a polarization switching element of a projector according to a second embodiment of the invention.

FIG. 10 is a diagram showing the polarization switching element of the projector according to the present embodiment, and is an x-y plan view viewed from the z-axis in FIG. 1.

In the case of the first embodiment, the explanation is presented assuming that the writing type of the image data of the liquid crystal light valves 6R, 6G, and 6B is the line sequential method. However, some of the liquid crystal light valves adopt the dot sequential method as the writing method of the image data. The projector according to the present embodiment uses the liquid crystal light valves adopting the dot sequential image data writing method as the light modulation element. In the liquid crystal light valves of the dot sequential type, the pixels arranged in a matrix are sequentially selected one-by-one to write the image data, and finally the image corresponding to one frame is completed.

In the case of using the liquid crystal light valves of such a writing type, unlike the line electrodes 43 in the first embodiment, it is necessary to use the polarization switching element 59 provided with a plurality of pixel-shaped electrodes 60 arranged in a matrix so as to correspond to the pixel arrangement of the liquid crystal light valves as shown in FIG. 10. Also in the present embodiment, in the intermediate image formed on the polarization switching element 59, both of the image of the previous sub-frame and the image of the newly rewritten present sub-frame exist on the respective sides of a predetermined boundary position at a certain time point.

However, in the case of the present embodiment, the boundary position do not only move in the vertical direction, but also moves in both of the horizontal and vertical directions such that the boundary position moves in the direction indicated by the arrow E1 in the horizontal direction with respect to the pixel group in a predetermined row, then moves in the direction indicated by the arrow E2 in the vertical direction, and then moves again in the horizontal direction with respect to the pixel group in the subsequent row. In conjunction therewith, the control section applies a predetermined voltage to a plurality of pixel-shaped electrodes 60 of the polarization switching element 59 in a dot sequential manner, and sequentially switches the orientational state of the liquid crystal to a predetermined state so that the boundary position between the switching area where the liquid crystal is in the S-polarization state (the first polarization state) and the switching area where the liquid crystal is in the P-polarization state (the second polarization state) moves in sync with the movement of the boundary position of the data writing.

Also in the present embodiment, since the writing of the respective image data in the liquid crystal light valves and the switching of the polarization state in the polarization switching element can be synchronized with each other spatially and temporally, there can be obtained substantially the same advantage as in the first embodiment such that the polarization state of the image light can be controlled to be the predetermined polarization state with high accuracy, and the high-resolution projection image with the apparent number of pixels appropriately increased can be obtained throughout the entire area of the screen.

Further, in the case of the present embodiment, it is also possible to adopt the configuration of being provided with two birefringent optical elements by providing a second birefringent optical element having the optical axis disposed in the plane perpendicular to the sheet of the drawing in addition to the birefringent optical element 11 having the optical axis P1 disposed in the plane parallel to the sheet shown in FIGS. 5A and 5B. According to this configuration, it is possible to double the apparent number of pixels arranged in the vertical direction (the y-axis direction) of the screen by the first birefringent optical element, and at the same time to double the apparent number of pixels arranged in the horizontal direction (the x-axis direction) of the screen by the second birefringent optical element. Therefore, it is possible to realize the high-resolution image display with the apparent number of pixels quadruplicated.

Obviously, also in the projector according to the first embodiment, by disposing the second birefringent optical element in addition to the birefringent optical element 11 as described above, the high-resolution image display with the apparent number of pixels quadruplicated can be realized. In this case, it is possible to adopt the configuration of displaying the four sub-frames, namely the first through fourth sub-frames, within the period of displaying one original frame, and to adopt the configuration of shifting the image of the second sub-frame only in the vertical direction (the y-axis direction) with respect to the first sub-frame, the image of the third sub-frame only in the horizontal direction (the x-axis direction), and the image of the fourth sub-frame in both of the vertical direction (the y-axis direction) and the horizontal direction (the x-axis direction) simultaneously.

Third Embodiment

Hereinafter, a third embodiment of the invention will be explained with reference to FIG. 11.

Although in the first embodiment the transmissive liquid crystal light valves are used as the light modulation element, the projector according to the present embodiment uses reflective liquid crystal light valves as the light modulation element. Hereinafter, a configuration example of the projector will be explained.

Figure 11:
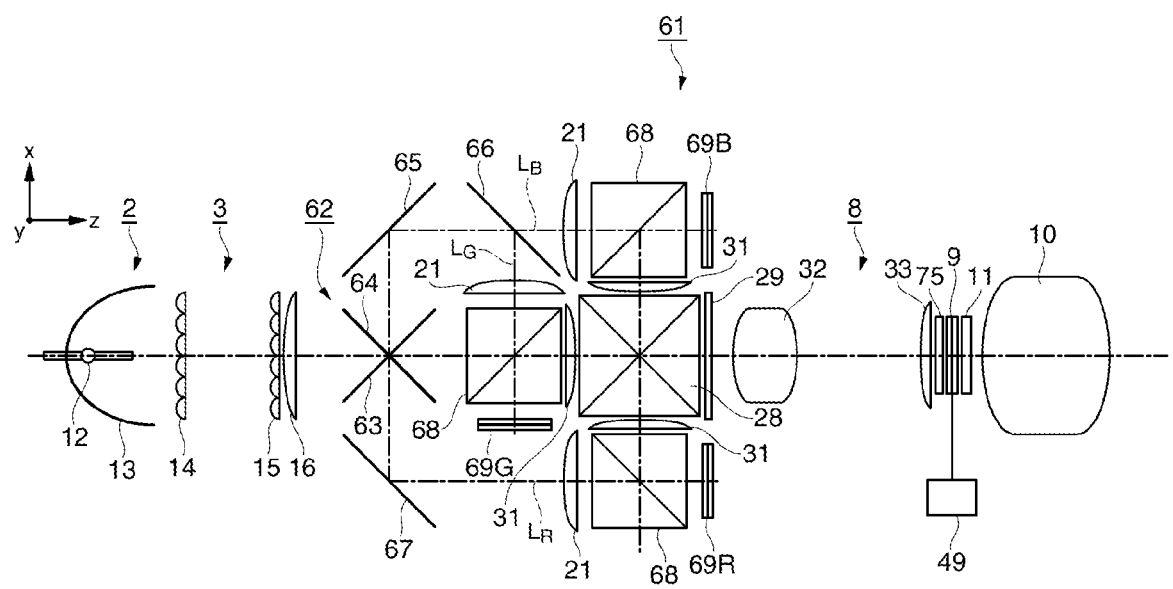
FIG. 11 is a schematic configuration diagram of a projector according to a third embodiment of the invention.

FIG. 11 is a schematic configuration diagram of the projector according to the present embodiment. In FIG. 11, the constituents common to FIG. 1 of the first embodiment are denoted with the same reference symbols, and the detailed explanation therefor will be omitted.

In the projector 61 according to the present embodiment, as shown in FIG. 11, dichroic mirrors 63, 64 as a color separation optical system 62 are disposed on the exit side of the overlapping lens 16 constituting the integrator optical system 3. The dichroic mirror 63 reflects the green light LG and the blue light LB while transmitting the red light LR. The dichroic mirror 64 transmits the green light LG and the blue light LB while reflecting the red light LR. Further, a reflecting mirror 65 and a dichroic mirror 66 are disposed on the light path of the green light LG and the blue light LB reflected by the dichroic mirror 63. The dichroic mirror 66 reflects the green light LG while transmitting the blue light LB out of the green light LG and the blue light LB reflected by the dichroic mirror 63.

The red light LR reflected by the dichroic mirror 64 is reflected by the reflecting mirror 67, and then enters the polarization split prism 68 via the collimating lens 21. The polarization split prism 68 has a polarization split surface for, for example, transmitting the P-polarized light while reflecting the S-polarized light, and the red light LR is changed by the polarization split surface to a specified polarization state, for example, the P-polarized light, and then input to the reflective liquid crystal light valve 69R. The light modulated by the liquid crystal light valve 69R into the different polarization state, for example, the S-polarized light, is reflected by the polarization split surface of the polarization split prism 68, and then enters the dichroic prism as the colored light combining optical system. The behaviors of the green light LG reflected by the dichroic mirror 66 and the blue light LB transmitted through the dichroic mirror 66 are substantially the same as that of the red light LR, and the explanation therefor will be omitted. The other constituents and the operations are substantially the same as those of the first embodiment.

It should be noted that although in the present configuration example entrance side lenses 31 of the light transmission optical system 8 are disposed between the polarization split prisms 68 and the cross dichroic prism 28, it is also possible to dispose the entrance side lenses 31 between the polarization split prisms 68 and the respective liquid crystal light valves 69R, 69G, and 69B. Further, it is also possible to integrate the three entrance side lenses 31 into one, and to dispose the one entrance side lens 31 on the exit side of the cross dichroic prism 28.

Also in the present embodiment, since the writing of the respective image data in the liquid crystal light valves 69R, 69G, and 69B and the switching of the polarization state in the polarization switching element 9 can be synchronized with each other spatially and temporally, there can be obtained substantially the same advantage as in the first embodiment such that the polarization state of the image light can be controlled to be the predetermined polarization state with high accuracy, and the high-resolution projection image with the apparent number of pixels appropriately increased can be obtained throughout the entire area of the screen.

It should be noted that the scope of the invention is not limited to the embodiments described above, but various modifications can be provided thereon within the scope or the spirit of the invention. For example, although in the embodiments described above the liquid crystal element is adopted as the polarization switching element, the polarization switching element is not limited to the liquid crystal element providing the element is capable of switching the polarization state locally and temporally at a high speed. Further, as the light modulation element, other light modulation elements using the line sequential method or the dot sequential method can also be adopted besides the transmissive liquid crystal light valves and the reflective liquid crystal light valves. Other than the above, the specific configuration of the constituents of the projector according to the embodiments is not limited to the embodiments described above, but can arbitrarily be modified.

The entire disclosure of Japanese Patent Application No. 2010-136218, filed Jun. 15, 2010 is expressly incorporated by reference herein.

What is claimed is:

1. A projector comprising:
a light source;
a light modulation element having a plurality of pixels arranged in a matrix to which an image data is written in a line sequential manner, and adapted to modulate the light from the light source based on the image data written to the pixels;
a polarization switching element having a plurality of linear switching areas adapted to switch a polarization state of the light input between a first polarization state and a second polarization state, and adapted to switch between the first polarization state and the second polarization state in a line sequential manner throughout the plurality of switching areas;
a birefringent optical element adapted to change a light path of a light input from the polarization switching element in accordance with the polarization state to thereby emit the light from a different position;
a light transmission optical system adapted to transmit the light modulated by the light modulation element to the polarization switching element, and to roughly image the light in the polarization switching element to form an intermediate image;
a projection optical system adapted to project the intermediate image formed in the polarization switching element; and
a control section adapted to control the polarization switching element,
wherein the control section switches between the first polarization state and the second polarization state in a line sequential manner so that a boundary position between the switching area of the polarization switching element set to the first polarization state and the switching area set to the second polarization state moves roughly in sync with a movement of a boundary position on the intermediate image corresponding to a boundary position between an area on the light modulation element to which a first image data corresponding to a first sub-frame is written and an area to which a second image data corresponding to a second sub-frame temporally contiguous to the first sub-frame is written.

2. The projector according to claim 1, wherein the number of the switching areas in the polarization switching element and the number of rows of the pixels in the light modulation element are equal to each other.

3. The projector according to claim 1, wherein the number of the switching areas in the polarization switching element is smaller than the number of rows of the pixels in the light modulation element.

4. The projector according to claim 1, wherein the number of the switching areas in the polarization switching element is larger than the number of rows of the pixels in the light modulation element.

5. The projector according to claim 1, wherein the light transmission optical system has a telecentric property on at least a side of the light modulation element.

6. The projector according to claim 1, wherein the light transmission optical system is a same-size transmission optical system.

7. The projector according to claim 1, wherein the light transmission optical system is a contraction transmission optical system.

8. The projector according to claim 1, wherein the light transmission optical system is an expansion transmission optical system.

9. The projector according to claim 1, further comprising:
a polarization compensation optical system disposed on a light path between the light transmission optical system and the polarization switching element, and adapted to compensate disturbance of the polarization state.

10. The projector according to claim 1, further comprising:
a polarization element of one of a light absorbing type and a light reflecting type disposed on an entrance side of the polarization switching element.

11. A projector comprising:
a light source;
a light modulation element having a plurality of pixels arranged in a matrix to which an image data is written in a dot sequential manner, and adapted to modulate the light from the light source based on the image data written to the pixels;
a polarization switching element having a plurality of switching areas adapted to switch a polarization state of the light input between a first polarization state and a second polarization state, and adapted to switch between the first polarization state and the second polarization state in a dot sequential manner throughout the plurality of switching areas;
a birefringent optical element adapted to change a light path of a light input from the polarization switching element in accordance with the polarization state to thereby emit the light from a different position;
a light transmission optical system adapted to transmit the light modulated by the light modulation element to the polarization switching element, and to roughly image the light in the polarization switching element to form an intermediate image;
a projection optical system adapted to project the intermediate image formed in the polarization switching element; and
a control section adapted to control the polarization switching element, wherein the control section switches between the first polarization state and the second polarization state in a dot sequential manner so that a boundary position between the switching area of the polarization switching element set to the first polarization state and the switching area set to the second polarization state moves roughly in sync with a movement of a boundary position on the intermediate image corresponding to a boundary position between an area on the light modulation element to which a first image data corresponding to a first sub-frame is written and an area to which a second image data corresponding to a second sub-frame temporally contiguous to the first sub-frame is written.

12. The projector according to claim 11, wherein the light transmission optical system has a telecentric property on at least a side of the light modulation element.

13. The projector according to claim 11, wherein the light transmission optical system is a same-size transmission optical system.

14. The projector according to claim 11, wherein the light transmission optical system is a contraction transmission optical system.

15. The projector according to claim 11, wherein the light transmission optical system is an expansion transmission optical system.

16. The projector according to claim 11, further comprising:
a polarization compensation optical system disposed on a light path between the light transmission optical system and the polarization switching element, and adapted to compensate disturbance of the polarization state.

17. The projector according to claim 11, further comprising:
a polarization element of one of a light absorbing type and a light reflecting type disposed on an entrance side of the polarization switching element.

* * * * *